G. Q. SEAMAN.
SPEED GEARING.
APPLICATION FILED AUG. 8, 1912.
1,052,977.
Patented Feb. 11, 1913.
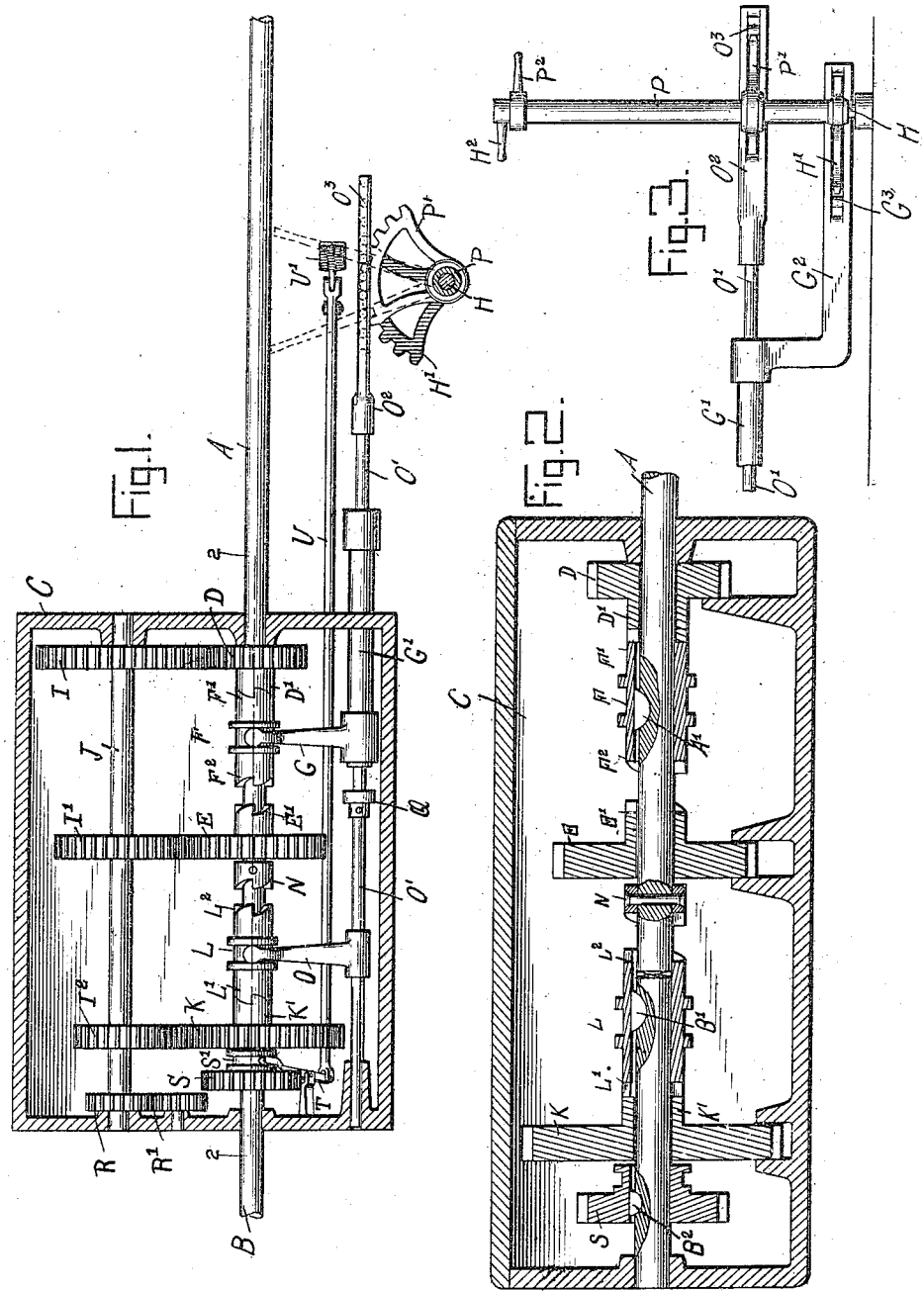
WITNESSES
INVENTOR
George Q. Seaman
BY
ATTORNEYS

UNITED STATES PATENT OFFICE.

GEORGE Q. SEAMAN, OF NEW YORK, N. Y.

SPEED-GEARING.

1,052,977.  Specification of Letters Patent.  Patented Feb. 11, 1913.

Application filed August 8, 1912. Serial No. 714,107.

*To all whom it may concern:*

Be it known that I, GEORGE Q. SEAMAN, a citizen of the United States, and a resident of the city of New York, borough of Brooklyn, in the county of Kings and State of New York, have invented a new and Improved Speed-Gearing, of which the following is a full, clear, and exact description.

The object of the invention is to provide a new and improved speed gearing for automobiles and other vehicles and devices, and arranged to permit the operator to readily change the speed from a low to a medium or a high speed, or to reverse, without moving any of the power-transmitting gear wheels out of mesh. For the purpose mentioned use is made of gear wheels of different diameters mounted to rotate loosely on a power shaft and which are provided with a clutch member, a driven shaft, a gear wheel loose on the driven shaft and larger in diameter than the large gear wheel on the said power shaft, a clutch member on the gear wheel of the driven sha , a countershaft provided with a series of gear wheels at all times in mesh with the gear wheels on the said power and driven shafts, a clutch member fixed on the said power shaft, and manually-controlled clutch members slidable on the said power and driven shafts and adapted to mesh with the said gear wheel clutch members and the said clutch member on the power shaft.

A practical embodiment of the invention is represented in the accompanying drawings forming a part of this specification, in which similar characters of reference indicate corresponding parts in all the views.

Figure 1 is a plan view of the speed gearing with the gear casing shown in section; Fig. 2 is an enlarged sectional side elevation of the same, on the line 2—2 of Fig. 1; and Fig. 3 is a side elevation of the manually-controlled actuating mechanism.

The power or engine shaft A is in axial alinement with the shaft B to be driven, and the said power shaft A and the driven shaft B extend into a gear casing C, as plainly illustrated in Figs. 1 and 2. On the power shaft A within the gear casing C are mounted to rotate loosely gear wheels D and E of different diameters and provided with clutch members D' and E' on opposite faces. The clutch members D' and E' are adapted to be engaged by clutch members F' and F² on the ends of a clutch F mounted to slide on a key A' held on the power shaft A, so that the clutch F rotates with the power shaft A. On shifting the clutch F to the right the clutch member F' engages the clutch member D' to rotate the gear wheel D, and on shifting the clutch F to the left, the clutch member F² engages the clutch member E' to rotate the gear wheel E. The clutch F is engaged by a shifting fork G held on a tubular rod G' mounted to slide lengthwise in one end of the gear casing C, and on the outer end of the rod G' is secured an arm G² provided with rack teeth G³ in mesh with a segmental gear wheel H' attached to a shaft H journaled on the vehicle and provided with a handle H² under the control of the operator to shift the clutch F to the right or to the left on turning the handle H² in the corresponding direction. The gear wheel D is in mesh at all times with a gear wheel I secured on a countershaft J journaled in the gear casing C, and on the said shaft J is also secured a gear wheel I' less in diameter than the gear wheel I and in mesh with the gear wheel E. On the shaft J is also secured a gear wheel I² less in diameter than the gear wheel I' and in mesh with a gear wheel K somewhat larger than the gear wheel E. The gear wheel K is mounted to rotate loosely on the driven shaft B and is provided with a clutch member K' adapted to be engaged by a clutch member L' on a clutch L, having a key-way engaging a key B' on the driven shaft B. The clutch L is provided with a second clutch member L² adapted to engage a clutch member N' fixed on the power or engine shaft A. The clutch L is engaged by a shifting fork O attached to a shifting rod O' mounted to slide at one end in the casing C and slidably engaging the tubular shifting rod G'. The outer end of the shifting rod O' is provided with an arm O² having rack teeth O³ in mesh with a segmental gear wheel P' attached to a hollow shaft P through which extends the shaft H previously mentioned. On the hollow shaft P is secured a handle P² under the control of the operator to permit the latter to turn the shaft P with a view to cause the gear wheel P' to impart a traveling motion to the shifting rod O' by the action of the rack teeth O³. When the handle P² is turned in one direction the clutch L is shifted, say to the left, to engage the clutch member L' with the clutch member K', and when the handle P² is turned in the opposite direction the clutch L is shifted to the right to move the clutch member L² in engagement with the fixed clutch member N on the driven shaft B. Normally the clutch member L stands in intermediate position, that is, with its clutch members L' and L² out of engagement with both clutch members K' and N.

On the shifting rod O' is secured a collar Q adapted to engage the inner end of the tubular shifting rod G', so as to move the latter and with it the clutch F to the right on moving the clutch L out of intermediate position and into mesh with the fixed clutch member N on the driven shaft B. Thus, in case the clutch member F² is in mesh with the clutch member E', and the operator shifts the clutch member L' into its extreme right-hand position, then the clutch member F² is shifted to the right to move the clutch member F² out of engagement with the clutch member E'. When it is desired to transmit a slow speed to rotate the shaft B at a low rate of speed from the power or engine shaft A, then the clutch F is moved to the right while the clutch L is shifted to the left, so that the clutch members F' and D' and the clutch members L' and K' are in mesh. The rotary motion of the shaft A is now transmitted by the gear wheels D and I to the countershaft J, and the rotary motion of the latter is transmitted by the gear wheels I² and K to the driven shaft B. When it is desired to rotate the shaft B at a high rate of speed then the clutch F is shifted to the left to move the clutch member F' out of mesh with the clutch member D' and to move the clutch member F² into mesh with the clutch member E'. The rotary motion now given to the gear wheel E is transmitted by the gear wheel I' to the countershaft J and the motion of the latter is transmitted by the gear wheels I² and K to the driven shaft B. When it is desired to drive the shaft B in unison with the power shaft A then the clutch L is moved into its extreme right-hand end position to engage the clutch member L² with the clutch member N and to move the clutch member F² out of engagement with the clutch member E'. The power of the shaft A is now directly transmitted by the clutch member N to the clutch L to rotate the shaft B, the other parts of the transmission mechanism being at a standstill and thus avoiding undue wear.

From the foregoing it will be seen that by the arrangement described the gear wheels D, I, E, I' and K, I² are always in mesh with each other, and consequently injury to the teeth thereof is prevented, and the shaft B can be driven at different speeds from the shaft A.

In order to drive the shaft B in a reverse direction from the power shaft A, the following arrangement is made: On the countershaft J is secured a gear wheel R in mesh with an intermediate gear wheel R' mounted to rotate in the casing C. On the shaft B is arranged a key B² engaging a key-way on a gear wheel S mounted to slide on the shaft B and adapted to move into mesh with the gear wheel R'. The gear wheel S is provided with a shifting collar S' engaged by a shifting lever T connected by a shifting rod U with a pedal lever U' under the control of the operator's foot, so that when the pedal lever U' is pressed the gear wheel S is shifted to the left into mesh with the gear wheel R' so that the rotary motion of the shaft J is transmitted by the gear wheels R, R' and S to the shaft B. The countershaft J is driven in this case by the use of the gear wheels D and I with the clutch L in intermediate dormant position and the clutch F in its extreme right-hand end position.

The speed gearing shown and described is comparatively simple and durable in construction, and is not liable easily to get out of order.

Having thus described my invention, what I claim as new and desire to secure by Letters Patent:

A speed gearing, comprising a power shaft, a shaft to be driven, a countershaft, a series of gear wheels of different diameters mounted to rotate loosely on the said power shaft and having clutch members at their opposite faces, a gear wheel mounted to rotate loosely on the said driven shaft and having a clutch member, a fixed clutch member on the said power shaft adjacent the clutch member of the gear wheel on the said driven shaft, a series of fixed gear wheels on the said countershaft in mesh with the gear wheels on the said power and driven shafts, movable clutch members on the said power and driven shafts and rotating with the same to engage corresponding gear wheel clutch members, shifting rods, one slidable through the other and having forks engaging the said movable clutch members, manually-controlled means for actuating the said shifting rods independently one of the other, and a collar on one shifting rod adapted to engage the other shifting rod.

In testimony whereof I have signed my name to this specification in the presence of two subscribing witnesses.

GEORGE Q. SEAMAN.

Witnesses:
SAMUEL J. O'CONNOR, Jr.,
MORRIS S. GARFINKEL.